United States Patent
Feng et al.

(10) Patent No.: US 7,003,458 B2
(45) Date of Patent: Feb. 21, 2006

(54) AUTOMATED VOICE PATTERN FILTER

(75) Inventors: Kai-Ten Feng, Fremont, CA (US); Jane F. MacFarlane, Oakland, CA (US); Stephen C. Habermas, San Carlos, CA (US)

(73) Assignee: General Motors Corporation, Detroit, MI (US)

( * ) Notice: Subject to any disclaimer, the term of this patent is extended or adjusted under 35 U.S.C. 154(b) by 907 days.

(21) Appl. No.: 10/047,898

(22) Filed: Jan. 15, 2002

(65) Prior Publication Data
US 2003/0135362 A1    Jul. 17, 2003

(51) Int. Cl.
*G10L 15/10* (2006.01)
*G10L 21/02* (2006.01)

(52) U.S. Cl. .................. 704/236; 704/226
(58) Field of Classification Search ............. 704/205, 704/226, 236, 234
See application file for complete search history.

(56) References Cited

U.S. PATENT DOCUMENTS

| | | | |
|---|---|---|---|
| 5,465,317 A | * | 11/1995 | Epstein .................. 704/236 |
| 5,566,272 A | * | 10/1996 | Brems et al. ............. 704/231 |
| 5,924,065 A | * | 7/1999 | Eberman et al. ......... 704/231 |
| 6,006,180 A | * | 12/1999 | Bardaud et al. .......... 704/223 |

OTHER PUBLICATIONS

An article entitled "Fundamentals of Speech Recognition", (Authors Lawrence Rabiner, Biing-Hwang Juang, Prentice Hall Signal Processing Series, Library of Congress Cataloging-in-Publication Data, © 1993 by AT&T, pp. 97-124.

* cited by examiner

*Primary Examiner*—Richemond Dorvil
*Assistant Examiner*—V. Paul Harper
(74) *Attorney, Agent, or Firm*—Anthony Luke Simon

(57) ABSTRACT

An automated voice pattern filtering method implemented in a system having a client side and a server side is disclosed. At the client side, a speech signal is transformed into a first set of spectral parameters which are encoded into a set of spectral shapes that are compared to a second set of spectral parameters corresponding to one or more keywords. From the comparison, the client side determines if the speech signal is acceptable. If so, spectral information indicating a difference in a voice pattern between the speech signal and the keyword(s) is encoded and utilized as a basis to generate a voice pattern filter.

17 Claims, 4 Drawing Sheets

AUTOMATED VOICE PATTERN FILTER

BACKGROUND OF THE INVENTION

1 Field of the Invention

The present invention generally relates to Automated Voice Pattern ("AVP") methods and devices. The present invention particularly relates to AVP methods and devices for providing a client-based voice pattern data packet for improving speech recognition performance.

2. Description of the Related Art

An Automated Speech Recognition ("ASR") platform as known in the art is designed to respond to a reception of a transmitted speech signal (e.g., voice commands) from a transceiver (e.g., mobile phones, embedded car phones, and phone enabled personal data assistants) with an audio signal that corresponds to the context of the transmitted speech signal. However, a performance of a prior art ASR platform can be adversely affected by any signal degradation of the transmitted speech signal (e.g., acoustical coupling and signal distortion) along a transmission signal path from a user of the transceiver to the ASR platform. The performance can also be adversely affected by variations in the voice pattern characteristics between different users of a transceiver.

Signal degradation of the transmitted speech signal has been addressed by the invention of a pre-ASR filter. The differences in voice patterns between individual users of the transceiver is addressed by the present invention.

SUMMARY OF THE INVENTION

The present invention relates to an automated voice pattern filter that overcomes the aforementioned disadvantages of the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is an automated voice pattern filtering method implemented in a system having a client side and a server side. At the client side, a speech signal is transformed into a first set of spectral parameters which are encoded into a set of spectral shapes that are compared to a second set of spectral parameters corresponding to one or more keywords. From the comparison, the client side determines if the speech signal is acceptable. If so, spectral information indicative of a difference in a voice pattern between the speech signal and the keyword(s) is encoded and utilized as a basis to generate a voice pattern filter.

The foregoing form, and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
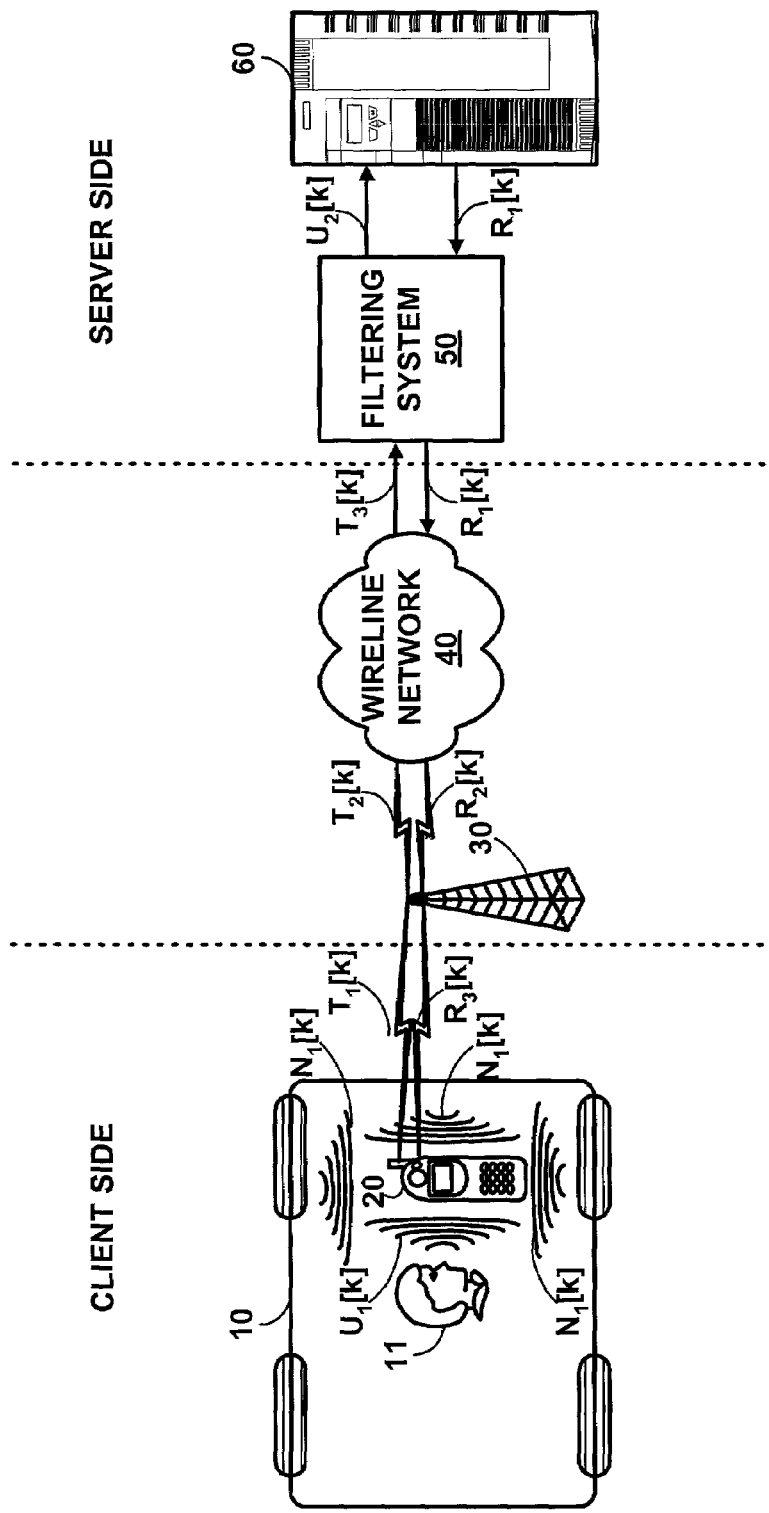
FIG. 1 is an illustration of a hands-free, in-vehicle environment in accordance with the present invention.

FIG. 1 represents a signal path during a time involving the transmissions and receptions of various voice signals between a client side and a server side of the system. Specifically, FIG. 1 illustrates a hands-free, in-vehicle environment containing a conventional vehicle 10 on the client side of the system, a conventional wireless network 30, a conventional wireline network 40, a new and unique filtering system 50 on the server side of the system, and a conventional ASR platform 60 on the server side of the system. A user 11 of a transceiver in the form of a mobile phone 20 is seated within vehicle 10. In other embodiments of the present invention, the transceiver can be in the form of an embedded car phone, a phone enabled personal data assistant, and any other transceiver for transmitting and receiving a phone call.

A more detailed explanation of the invention will now be provided herein. Those having ordinary skill in the art will appreciate that the various described signals are based upon a discrete time instant k and the various described filters are based upon a discrete time, frequency domain operator z. Specifically, the operator z is used to represent the frequency response characteristics of the filters and the models described herein.

Mobile phone 20 conventionally transmits a transmission signal $T_1[k]$ to wireless network 30 in response to user 11 articulating a speech signal $U_1[k]$ in a direction of a microphone (not shown) of mobile phone 20. Speech signal $U_1[k]$ is a main component of transmission signal $T_1[k]$. A noise signal $N_1[k]$ consisting of noise emanating from various sources of vehicle 10 (e.g., an engine, a heater/air conditioner, a radio, and a pair of wiper blades) are also components of transmission signal $T_1[k]$. In addition, an audio signal (not shown) being an acoustically coupled form of an audio signal $R_3[k]$ is a component of transmission signal $T_1[k]$. Transmission signal $T_1[k]$ therefore ranges from a slightly distorted version of speech signal $U_1[k]$ to a significantly distorted version of speech signal $U_1[k]$ as a function of an intensity of the vehicle noise signal $N_1[k]$ and an intensity of audio signal (not shown) generated by mobile phone 20, wireless network 30, and wireline network 40. Wireless network 30 (e.g., an advanced mobile phone service, a time division multiple access network, a code division multiple access network, and a global system for mobile communications) conventionally transmits a transmission signal $T_2[k]$ to wireline network 40 in response to a reception of transmission signal $T_1[k]$ by wireless network 30. The conventional transmission of transmission signal $T_2[k]$ involves a degree of signal distortion and a degree of signal attenuation of transmission signal $T_1[k]$ by wireless network 30. Transmission signal $T_2[k]$ therefore ranges from a slightly distorted version of transmission signal $T_1[k]$ to a significantly distorted version of transmission signal $T_1[k]$ as a function of an intensity of the signal distortion and an intensity of the signal attenuation by wireless network 30 upon transmission signal $T_1[k]$.

Wireline network 40 (e.g., a Public Switched Telephone Network, and VoIP network) conventionally transmits a transmission signal $T_3[k]$ to Filtering system 50 in response to a reception of transmission signal $T_2[k]$ by wireline network 40. The conventional transmission of transmission signal $T_3[k]$ involves a degree of signal distortion and a degree of signal attenuation of transmission signal $T_2[k]$ by wireline network 40. Transmission signal $T_3[k]$ therefore ranges from a slightly distorted version of transmission signal $T_2[k]$ to a significantly distorted version of transmission signal $T_2[k]$ as a function of an intensity of the signal distortion and an intensity of the signal attenuation by wireline network 40 upon transmission signal $T_2[k]$.

Figure 5:
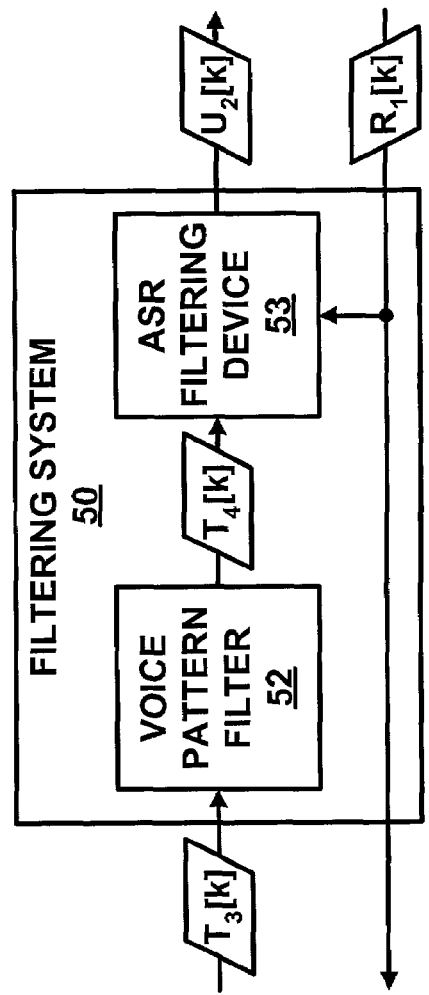
FIG. 5 is a block diagram of one embodiment of a filtering system during an operation of a voice pattern filter in accordance with the present invention.

As shown in FIG. 5, filtering system 50 includes a voice pattern filter 52 and an ASR filtering device 53 to transmits a speech signal $U_2[k]$ to ASR platform 60 (e.g., a computer platform employing commercially available speech recognition software from Nuance of Menlo Park, Calif. or SpeechWorks of Boston, Mass.) in response to a reception of transmission signal $T_3[k]$ and audio signal $R_1[k]$ by filtering system 50. The unique transmission of speech signal $U_2[k]$ by filtering system 50 involves two important aspects. First, voice pattern filter 52 provides a speech signal $T_4[k]$ to ASR filtering device 53 in response to transmission signal $T_3[k]$ whereby a voice pattern characteristic of user 11 is ascertained to thereby enhance the voice recognition capability of ASR platform 60.

Second, as described in U.S. patent application Ser. No. (to be filled in later) entitled "Automated Speech Recognition Filter", the entirety of which is incorporated herein by reference, the ASR filtering device 53 utilizes profile based characteristics of vehicle 10, mobile phone 20, wireless network 30, and wireline network 40 as well as a utilization of real-time signal characteristics of transmission signal $T_4[k]$, audio signal $R_1[k]$, and an estimate of vehicle noise signal $N_1[k]$. The result is a transmission of speech signal $U_2[k]$ by filtering system 50 to ASR platform 60 as an approximation of speech signal $U_1[k]$. An improved performance of ASR platform 60 is therefore facilitated by a reception of speech signal $U_2[k]$ by ASR platform 60.

Figure 2:
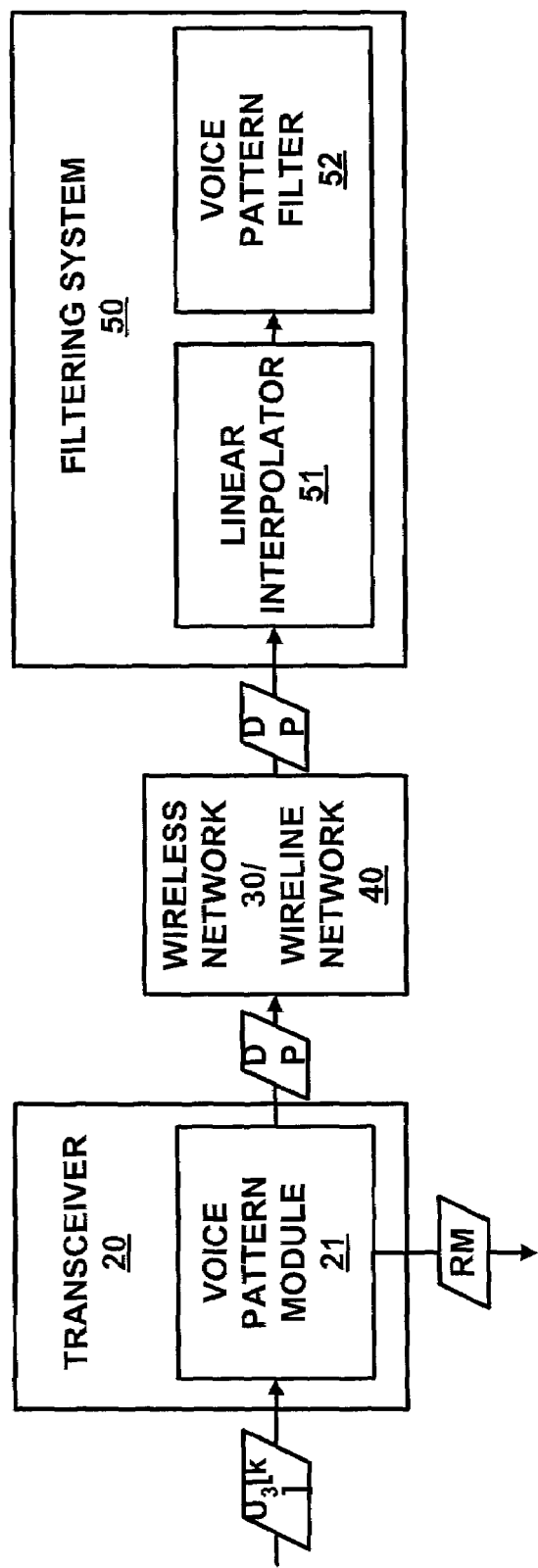
FIG. 2 is a block diagram of one embodiment of a transceiver and a filtering system during an initialization of a voice pattern filter in accordance with the present invention.

FIG. 2 represents the data transmission path that is necessary to transmit a data packet DP to the server side of the system. Specifically, FIG. 2 illustrates a generation of voice pattern filter 52. First, the user 11 articulates a speech signal $U_1[k]$ including one or more pre-specified keywords $W_p$ (1 p P) whereby a voice pattern recognition module 21 receives a speech signal $U_3[k]$ resulting from the summation of speech signal $U_1[k]$, noise signal $N_1[k]$, and an audio signal (not shown) being an acoustically coupled form of audio signal $R_3[k]$. In response thereto, voice pattern recognition module 21 provides a data packet DP via wireless network 30 and wireline network 40 to filtering system 50 when the frequency characteristics of the speech signal $U_1[k]$ as represented by the spectral vector $V_p$ are acceptable when compared to its corresponding keyword $W_p$. In response to data packet DP, a linear interpolator 51 conventionally establishes an input for voice pattern filter 52. Conversely, the voice pattern recognition module 21 provides a rejection message RM to user 11 via a speaker of mobile phone 20 when the frequency characteristics of the speech signal $U_1[k]$ as represented by the spectral vector $V_p$ are unacceptable.

Figure 3:
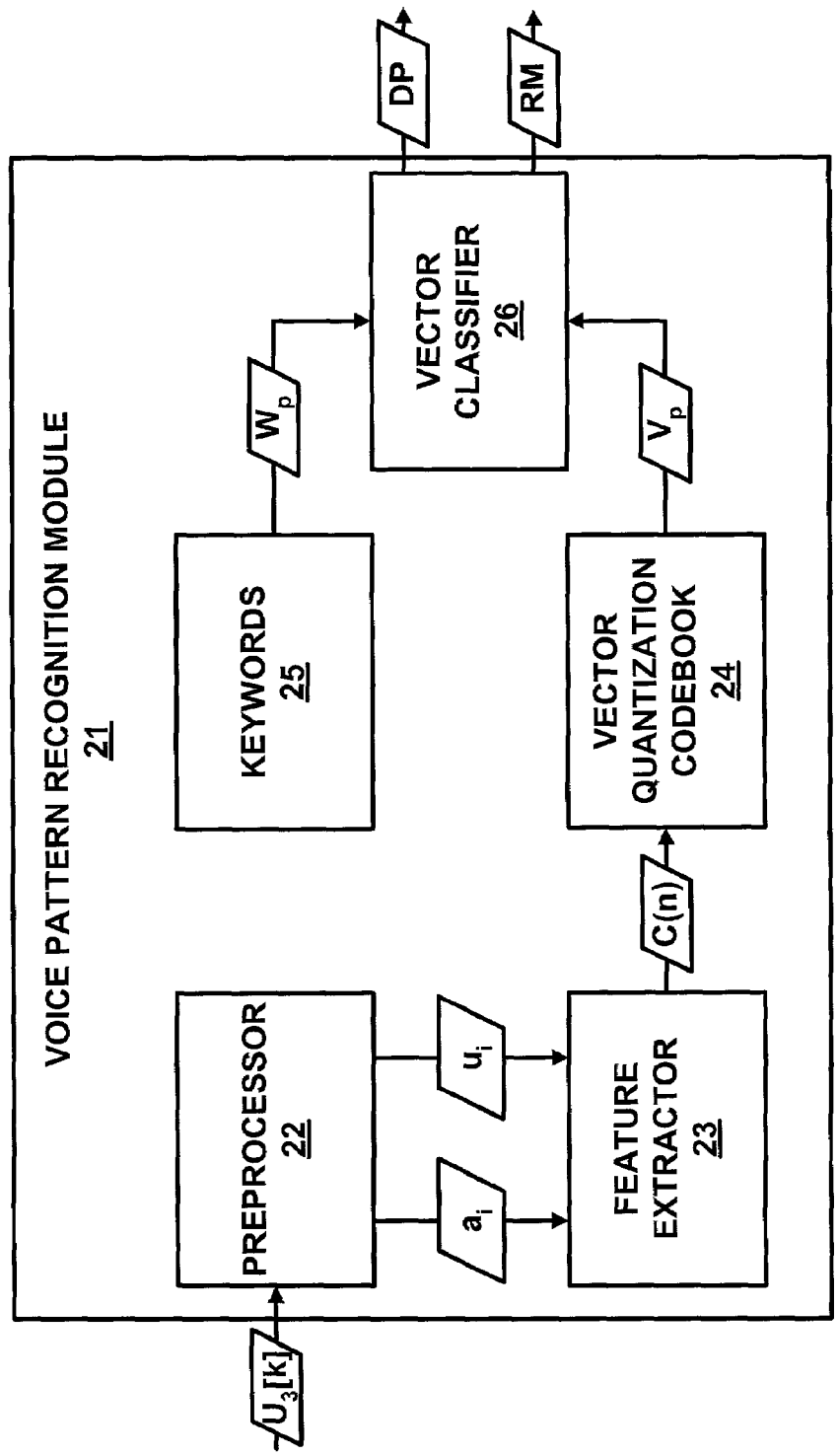
FIG. 3 is a block diagram of one embodiment of a voice pattern recognition system in accordance with the present invention.
Figure 4:
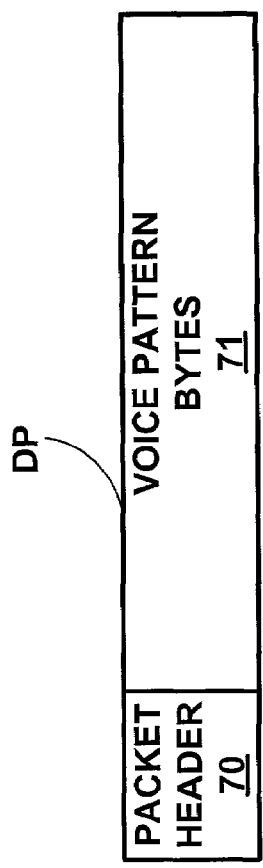
FIG. 4 is an illustration of one embodiment of a voice data packet in accordance with the present invention.

FIG. 3 illustrates one embodiment of voice pattern recognition module 21 for ascertaining the acceptability of the spectral vector $V_p$. A preprocessor 22 receives speech signal $U_3[k]$ and in response thereto, provides a set of pole-zero coefficients $\{a_i, u_i\}$. In one embodiment, a Linear Prediction Model (LPM) is used to represent the speech signal $U_3[k]$ in accordance with the following equation [1]:

$$U_3[k] = \sum_{i=1}^{L} a_i U_2[k-i] + e[k] \quad [1]$$

Equation [1] uses the assumption that the speech signal $U_3[k]$ is a linear combination of L previous samples. The $a_i$ coefficients are the resulting predictor coefficients, which are chose to minimize a mean square filter prediction error signal $e[k]$ summed over the analysis window. The preprocessor 22 transforms the speech signal $U_3[k]$ into a representation of a corresponding spectral signal $U_3(z)$. The transformed pole-zero transfer function is computed in accordance with the following equation [2]:

$$U_3(z) = \frac{\prod_{i=1}^{u}(1-u_i z^{-1})}{\prod_{i=1}^{a}(1-a_i z^{-1})} \quad [2]$$

with the assumption that spectral signal $U_3(z)$ is minimum phase.

A feature extractor 23 receives pole-zero coefficients $\{a_i, u_i\}$, and in response thereto, provides a set of cepstral coefficients $C(n)$ representative of a spectral parameters corresponding to speech signal $U_3[k]$. In one embodiment, feature extractor 23 computes the cepstral coefficients $C(n)$ in accordance with the following equation [3]:

$$C(n) = \frac{1}{n}\sum_{i=1}^{a} a_i^n - \frac{1}{n}\sum_{i=1}^{u} u_i^n \quad [3]$$

A vector quantization codebook 24 receives cepstral coefficients $C(n)$, and in response thereto, conventionally provides spectral vector $V_p$. In one embodiment, vector quantization codebook 24 conventionally transforms the cepstral coefficients $C(n)$ to the spectral vector $V_p$.

A vector classifier 26 receives the spectral vector $V_p$ as well as keyword $W_p$ from a keywords module 25. It is assumed that the dimension of the spectral vector $V_P$ and keyword $W_P$ is m. In response thereto, the vector classifier 26 provides either the data packet DP or the rejection message RM. In one embodiment, the vector classifier 26 first computes an index p* in accordance with the following equation [4]:

$$p^* = \arg \min_{1 \le p \le P} d(V_p, W_p) \quad [4]$$

where d is a smallest distance between spectral vector $V_p$ and keyword $W_p$.

Next, the vector classifier 26 ascertains whether the $d(V_p{}^*, W_p{}^*)$ is less than a threshold T. If so, the vector classifier 26 provides data packet DP. Otherwise, the vector classifier 26 provides reject message RM. In one embodiment, the data packet DP includes at least a packet header 70, and a set of voice pattern bytes 71 having m bytes of spectral information $\Delta=[\Delta_1, \Delta_2, \ldots, \Delta_m]$ which represents the average spectral difference between spectral vector $V_P$ and corresponding keyword $W_P$. The purpose of the linear interpolator 51 is to transform a discrete spectral information $\Delta=[\Delta_1, \Delta_2, \ldots, \Delta m]$ into a continuous frequency spectrum $\Delta(z)$ employed by voice pattern filter 52, which captures the spectral difference between the speech signal $U_3[k]$ and keyword $W_P$. With voice pattern filter 52, the performance of ASR platform 60 can be improved by accounting for the spectral difference between individual speakers.

Voice pattern module 21 (FIGS. 2 and 3) may consist of hardware digital and/or analog), software, or a combination of hardware and software. Those having ordinary skill in the art will appreciate a sequential operation of the components of voice pattern module 21 (e.g., in a software implementation) and a concurrent operation of each component of the voice pattern module 21 (e.g., in a hardware implementation). In alternative embodiments, voice pattern module 21 may be alternatively incorporated within wireless network 30 (FIG. 2), wireline network 40 (FIG. 2), and filtering system (50), or distributed among transceiver 20, wireless network 30, wireline network 40 and/or filtering system 50.

Voice pattern filter 52 (FIGS. 2 and 5) may consist of hardware digital and/or analog), software, or a combination of hardware and software. In alternative embodiments, voice pattern filter 52 may be alternatively incorporated within transceiver 20, wireless network 30 (FIG. 2), and wireline network 40 (FIG. 2), or distributed among transceiver 20, wireless network 30, wireline network 40 and/or filtering system 50.

Filtering system 50 has been described herein as a prefiltering system in electrical communication with ASR platform 60 (FIG. 1). In alternative embodiments of the present invention, filtering system 50 may be incorporated into ASR platform 60.

Filtering system 50 has also been described herein in the context of an employment within a telecommunication system having a transceiver situated within a vehicle. In alternative embodiments of the present invention, filtering system 50 may be employed within various other systems used for audio communication purposes such as, for example, a video conferencing system, and the transceivers of such systems can be situated within the system as would occur to those having ordinary skill in the art.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. In a system having a client side and a server side, a method for generating an automated voice pattern filter, said method comprising:

comparing a set of spectral shapes to a set of spectral parameters, the set of spectral shapes corresponding to a speech signal on the client side, the set of spectral parameters corresponding to one or more keywords;

determining an acceptability of the speech signal in response to the comparison of the set of spectral shapes to the set of spectral parameters;

determining spectral information indicative of an encoded difference in a voice pattern between the speech signal and the one or more keywords when the speech signal is determined to be acceptable; and generating the voice pattern filter as a function of the spectral information to thereby facilitate an optimal performance of the server side.

2. The method of claim 1, further comprising:

transmitting a data packet including the spectral information from the client side to the server side to thereby generate the voice pattern filter on the server side.

3. In a system having a client side and a server side, a method for generating an automated voice pattern filter, said method comprising:

determining a distance between a set of spectral shapes and a set of spectral parameters, the set of spectral shapes corresponding to a speech signal on the client side, the set of spectral parameters corresponding to one or more keywords;

determining spectral information indicative of an encoded difference in a voice pattern between the speech signal and the one or more keywords when the distance is less than an established threshold; and generating the voice pattern filter as a function of the spectral information to thereby facilitate an optimal performance of the server side.

4. The method of claim 3, further comprising:

transmitting a data packet including the spectral information from the client side to the server side to thereby generate the voice pattern filter on the server side.

5. In a system having a client side and a server side, a method for operating an automated voice pattern filter, said method comprising:

determining spectral information indicative of an encoded difference in a voice pattern between a speech signal on the client side and one or more keywords;

transforming the spectral information into a continuous frequency spectrum indicative of the encoded difference in the voice pattern between the speech signal and the one or more keywords; and operating the voice pattern filter on the basis of the continuous frequency spectrum.

6. The method of claim 5, further comprising:

transmitting a data packet including the spectral information from the client side to the server side to thereby transform the spectral information into the continuous frequency spectrum on the server side.

7. In a system having a client side and a server side, the system including a voice pattern filter, an automated speech recognition filtering device and an automated speech recognition platform, a method for operating system, said method comprising:

operating the voice pattern filter on a basis of a continuous frequency spectrum indicative of an encoded difference in a voice pattern between a speech signal and one or more keywords;

operating the automated speech recognition filtering device on a basis of profile based characteristics of a first signal path from the client side to the server side and a second signal path from the server side to the client side; and filtering a speech signal sequentially through the voice pattern filter and the automated speech recognition filtering device to the automated speech recognition platform to thereby facilitate an optimal performance of the automated speech recognition platform.

8. In a system having a client side and a server side, a method comprising:
- comparing a set of spectral shapes to a set of spectral parameters, the set of spectral shapes corresponding to a speech signal on the client side, the set of spectral parameters corresponding to one or more keywords;
- determining an acceptability of the speech signal in response to the comparison of the set of spectral shapes to the set of spectral parameters;
- transmitting a data packet from the client side to the server side when the speech signal is determined to be acceptable, the data packet including spectral information indicative of an encoded difference in a voice pattern between the speech signal and the one or more keywords;
- transforming the spectral information into a continuous frequency spectrum indicative of the encoded difference in the voice pattern between the speech signal and the one or more keywords;
- operating a voice pattern filter on the server side on a basis of the continuous frequency spectrum;
- operating the automated speech recognition filtering device on the server side on a basis of profile based characteristics of a first signal path from the client side to the server side and a second signal path from the server side to the client side; and
- filtering the speech signal sequentially through the voice pattern filter and the automated speech recognition filtering device to a automated speech recognition platform on the server side to thereby facilitate an optimal performance of the automated speech recognition platform.

9. A system having a client side and a server side, said system comprising:
- a module,
- wherein said module is operable to compare a set of spectral shapes to a set of spectral parameters, the set of spectral shapes corresponding to a speech signal on the client side, the set of spectral parameters corresponding to one or more keywords,
- wherein said module is further operable to determine an acceptability of the speech signal in response to the comparison of the set of spectral shapes to the set of spectral parameters, and
- wherein said module is further operable to determine spectral information indicative of an encoded difference in a voice pattern between the speech signal and the one or more keywords when the speech signal is determined to be acceptable; and
- a voice pattern filter, said voice pattern filter generated as a function of the spectral information to thereby facilitate an optimal performance of the server side.

10. The system of claim 9, wherein:
- said module is further operable to transmit the spectral information from the client side to the server side to thereby generate the voice pattern filter on the server side.

11. A system having a client side and a server side, said system comprising:
- a module,
- wherein said module is operable to determine a distance between a set of spectral shapes and a set of spectral parameters, the set of spectral shapes corresponding to a speech signal on the client side, the set of spectral parameters corresponding to one or more keywords, and
- wherein said module is further operable to determine spectral information indicative of an encoded difference in a voice pattern between the speech signal and the one or more keywords when the distance is less than an established threshold; and
- a voice pattern filter on the server side, said voice pattern filter generated as a function of the spectral information to thereby facilitate an optimal performance of the server side.

12. The system of claim 11, wherein:
- said module is further operable to transmit the spectral information from the client side to the server side to thereby generate the voice pattern filter on the server side.

13. A system having a client side and a server side, said system comprising:
- a module operable to determine spectral information indicative of an encoded difference in a voice pattern between a speech signal on the client side and one or more keywords; and
- a voice pattern filter generated as a function of a transformation of the spectral information into a continuous frequency spectrum indicative of the encoded difference in the voice pattern between the speech signal and the one or more.

14. The system of claim 13, wherein:
- said module is further operable to transmit the spectral information from the client side to the server side to thereby generate the voice pattern filter on the server side.

15. A system having a client side and a server side, said system comprising:
- a voice pattern filter operable on a basis of a continuous frequency spectrum indicative of an encoded difference in a voice pattern between a speech signal on the client side and one or more keywords;
- an automated speech recognition filtering device operable on a basis of a set of profile based characteristics of a first signal path from the client side to the server side and a second signal path from the server side to the client side; and
- an automated speech recognition platform,
- wherein a filtering of the speech signal through said voice pattern filter and said automated speech recognition filtering device to said automated speech recognition platform facilitate a an optimal performance of the automated speech recognition platform.

16. A system having a client side and a server side, said system comprising:
- a module,
- wherein said module is operable to compare a set of spectral shapes to a set of spectral parameters, the set of spectral shapes corresponding to a speech signal on the client side, the set of spectral parameters corresponding to one or more keywords,
- wherein said module is further operable to determine an acceptability of the speech signal in response to the comparison of the set of spectral shapes to the set of spectral parameters, and
- wherein said module is further operable to transmit a data packet from the client side to the server side when the speech signal is determined to be acceptable, the data packet including spectral information indicative of an encoded difference in a voice pattern between the speech signal and the one or more keywords;
- a voice pattern filter operable on a basis of a transformation of the spectral information into a continuous frequency spectrum indicative of the encoded difference in the voice pattern between the speech signal and the one or more keywords;

an automated speech recognition filtering device operable on a basis of a set of profile based characteristics of a first signal path from the client side to the server side and a second signal path from the server side to the client side; and an automated speech recognition platform, wherein a filtering of the speech signal through said voice pattern filter and said automated speech recognition filtering device to said automated speech recognition platform facilitate a an optimal performance of the automated speech recognition platform.

17. The system of claim 16, further comprising:
a transceiver on the client side containing said module.

* * * * *